United States Patent [19]

Tuminello et al.

[11] Patent Number: 5,652,025

[45] Date of Patent: Jul. 29, 1997

[54] SOLVENTS FOR TETRAFLUOROETHYLENE POLYMERS

[75] Inventors: William Howard Tuminello, Newark; Robert John Cavanaugh, Wilmington, both of Del.

[73] Assignee: E. I. Du Pont de Nemours and Company, Wilmington, Del.

[21] Appl. No.: 694,735

[22] Filed: Aug. 9, 1996

Related U.S. Application Data

[60] Continuation of Ser. No. 467,254, Jun. 6, 1995, abandoned, which is a division of Ser. No. 220,477, Mar. 31, 1994, Pat. No. 5,459,191, which is a division of Ser. No. 936,449, Aug. 28, 1992, Pat. No. 5,328,946, which is a continuation-in-part of Ser. No. 751,481, Aug. 29, 1991, abandoned.

[51] Int. Cl.$^6$ .................................................. B05D 3/02
[52] U.S. Cl. ............................. 427/385.5; 427/430.1
[58] Field of Search ........................... 427/430.1, 385.5; 524/462, 545, 546

[56] References Cited

U.S. PATENT DOCUMENTS 3,461,129  8/1969  Middleton ............................ 260/307
4,360,488  11/1982  Barham ............................... 264/210.1
4,391,844  7/1983  Baczek et al. ........................ 427/44
4,414,280  11/1983  Silva et al. .......................... 428/422

FOREIGN PATENT DOCUMENTS 11-92812  8/1989  Japan ................................ D01F 6/12

OTHER PUBLICATIONS

B. Chu et al.,, *Macromol*, vol. 20, p. 20, pp. 700–702 (1987); Macromol, vol. 21, pp. 397–402 (1988); Macromol., vol. 22, pp. 831–837 (1989).
B. Chu et al, *J. Appl. Polym. Sci., Appl. Polym. Sym.*, vol. 45, pp. 243–260, (1990).
P. Smith and K. Gardner, *Macromol.*, vol. 18, pp. 1222–1228, (1985).

*Primary Examiner*—Peter D. Mulcahy

[57] ABSTRACT

Perfluorinated cycloalkane solvents for dissolving high melting polymers containing tetrafluoroethylene, are disclosed. These solvents dissolve such polymers more rapidly, and/or are more stable, than previously known solvents. Also disclosed is a process for dissolution of the polymers and their resulting solutions. The solutions are useful for making polymer films, coatings and for encapsulating objects.

4 Claims, No Drawings

SOLVENTS FOR TETRAFLUOROETHYLENE POLYMERS

CROSS-REFERENCE TO RELATED APPLICATIONS

This is a continuation of application Ser. No. 08/467,254 now abandoned filed Jun. 6, 1995, which is a divisional of application Ser. No. 08/220,477 filed Mar. 31, 1994 and now U.S. Pat. No. 5,459,191, which was a divisional of application Ser. No. 07/936,449 filed Aug. 28, 1992 and now U.S. Pat. No. 5,328,946, which was a continuation-in-part of application Ser. No. 07/751,481 filed Aug. 29, 1991 and now abandoned.

FIELD OF INVENTION

Novel perfluorinated cycloaliphatic solvents for relatively rapidly dissolving high melting tetrafluoroethylene polymers are disclosed. Also disclosed are solutions of the polymers in the solvents, a process for forming the polymer solution, and processes for encapsulating and forming films from the solutions. Solutions of the polymers are useful for preparing polymer films, which in turn are useful in electronic parts and in applications where chemical and/or high temperature resistance is required.

TECHNICAL BACKGROUND

This invention concerns novel solvents for dissolving polymers containing tetrafluoroethylene (particularly the homopolymer, PTFE) which have a relatively high melting point. The solvents dissolve such polymers more rapidly, and/or the solutions are more stable, than previously disclosed solvents, which are advantages in equipment utilization and other manufacturing costs, and/or the purity of the resulting solution and any product made from it. For example, the instant solvents dissolve the TFE polymers more rapidly than perfluorinated aliphatic compounds, and do not discolor (at the required elevated temperatures) as perfluorinated aromatic solvent solutions may do.

U.S. Pat. No. 4,360,388 discloses certains solvents for TFE polymers, including perfluorodecalin, perfluoromethyldecalin, perfluorodimethyldecalin, perfluoromethylcyclohexane and perfluoro(1,3-dimethylcyclohexane). All of these solvents are believed to have critical temperatures below 340° C., and hence are not solvents for PTFE.

B. Chu, et al., in a series of papers [Macromol., vol. 20, p. 702–703 (1987); Macromol., vol. 21, p. 397–402 (1988); Macromol., vol. 22, p. 831–837 (1989); J. Appl. Polym. Sci., Appl. Polym. Sym., vol. 45, p. 243–260 (1990)] describe the measurement of the molecular weight of poly (tetrafluoroethylene) (hereinafter sometimes PTFE) in solution. The solvents used in these studies were perfluorotetracosane and oligomers of poly(chlorotrifluoroethylene).

P. Smith and K. Gardner, Macromol., vol. 18, p. 1222–1228 (1985) review and discuss both the practical and theoretical aspects of dissolving PTFE. As reported by them, PTFE has been dissolved only in perfluorokerosenes and perfluorinated oils, in other words, perfluorinated higher molecular weight alkanes. They report that PTFE will not dissolve in perfluorodecalin, octafluoronaphthalene or decafluorobenzophenone. There is no discussion in this paper on the rates of dissolution of PTFE in solvent.

U.S. Pat. No. 3,461,129 reports in Example A that 4-ethoxy-2,2,5,5-tetrakis(trifluormethyl)-3-oxazoline dissolves low-melting (83°–145° C. melting point) PTFE. There is no mention of dissolution of higher melting PTFE.

SUMMARY OF THE INVENTION

This invention concerns a process for dissolving tetrafluoroethylene polymers comprising, contacting a solvent which is a perfluorinated cycloalkane with a polymer containing tetrafluoroethylene units under autogenous pressure at a high enough temperature and for a sufficient amount of time to dissolve said polymer, provided that:

said solvent may be substituted with one or more perfluoroalkyl and perfluoroalkylene groups, but the total number of carbon atoms in said perfluoroalkyl and perfluoroalkylene groups is less than the total number of ring carbon atoms in said solvent;

the critical temperature of said solvent is 340° C. or more; and the melting point of said polymer is about 250° C. or more.

This invention also concerns a composition, comprising, a solution of a polymer containing tetrafluoroethylene units dissolved in a solvent which is a perfluorinated cycloalkane, provided that:

said solvent may be substituted with one or more perfluoroalkyl and perfluoroalkylene groups, but the total number of carbon atoms in said perfluoroalkyl and perfluoroalkylene groups is less than the total number of ring carbon atoms in said solvent;

the critical temperature of said solvent is about 340° C. or more; and the melting point of said polymer is about 250° C. or more.

DETAILS OF THE INVENTION

The polymers useful herein are homo- and copolymers that contain "tetrafluoroethylene units", that is units derived from the free radical polymerization of tetrafluoroethylene (TFE), and are understood to have the formula —$CF_2$—$CF_2$—. Polymers containing TFE units, particularly the homopolymer (PTFE) and copolymers containing relatively high proportions of TFE, tend to have high melting points, and these high melting points, combined with the relative chemical inertness of these polymers makes them difficult to dissolve (see Smith and Gardner, supra, which is hereby included by reference). In the TFE copolymers useful in this invention, it is preferred if the comonomer(s) are perfluorinated, and especially preferred if the comonomer is selected from the group consisting of hexafluoropropylene, perfluoro(methyl vinyl ether), and perfluoro(propyl vinyl ether). Also preferred is the homopolymer of tetrafluoroethylene. All of these polymers are known to those skilled in the art, and many are items of commerce.

Polymers useful in the present invention have a melting point (of pure polymer in the absence of solvent) of about 250° C. or higher, preferably about 265° C. or higher. As is known to those skilled in the art, polymer melting points are measured by Differential Scanning Calorimetry, and the melting points herein are measured at a heating rate of 20° C./min, and the melting point is taken as the minimum (peak) of the melting point endotherm.

Compounds useful herein as solvents are perfluorinated cycloalkanes. By perfluorinated cycloalkanes are meant saturated cyclic compounds, which may contain fused or unfused rings. In addition, the perfluorinated cycloalkane may be substituted by perfluoroalkyl and perfluoroalkylene groups. By perfluoroalkyl group is meant a saturated branched or linear carbon chain. By perfluoroalkylene group is meant an alkylene group which is branched or linear and is bound to two different carbon atoms in carbocyclic rings. The total number of carbon atoms in all of the perfluoroalkyl and perfluoroalkylene groups in a molecule of the solvent must be less than the total number of carbon atoms in the carbocyclic rings of a solvent molecule. It is preferred if there are at least twice as many carbon atoms in the rings of the solvent molecule as there are atoms in the perfluoroalkyl and perfluoroalkylene groups.

In order to insure that the solvent will actually dissolve the polymer (particularly PTFE), the critical temperature of the solvent should be 340° C. or higher, preferably about 360° C. or higher. Critical temperatures of many compounds can be found in standard references, and may be measured by methods known to those skilled in the art.

Compounds useful as solvents herein include, but are not limited to, perfluoro(tetradecahydrophenanthrene), perfluorodimer and perfluoro[(cyclohexylmethyl)decalin]. Preferred solvents are perfluoro(tetradecahydrophenanthrene), and perfluro[(cyclohexylmethyl)decalin]. Another preferred solvent is perfluorodimer.

The process of dissolving the TFE containing polymer is carried out under autogenous pressure, at the temperature required to dissolve the polymer. The minimum temperature required can be determined by simple experimentation (see "General Procedure"), and will vary with the polymer and solvent. Generally speaking lower melting polymers will require lower temperatures, while higher melting polymers such as PTFE will require higher temperatures. Useful temperatures are illustrated in the Examples, and are sometimes above the boiling point at atmospheric pressure of the solvent, so that a pressure vessel will be needed to avoid boiling of the solvent and contain the autogenous pressure of the solvent. By autogenous pressure is meant the sum of the vapor pressures of the constituents of the process at the process temperature. The temperature must not be above the critical temperature of the solvent, so the critical temperature of the solvent must be above the temperature of dissolution.

The solvent and polymer must be stable at the process temperature. Exposure of the hot polymer to active metals such as aluminum may cause polymer decomposition. Stirring or other forms of agitation will increase the rate of dissolution of the polymer. Other factors which influence the rate of dissolution and their effect are, higher interfacial surface area between the polymer and solvent gives faster rates, and higher polymer molecular weight and higher polymer concentrations give slower rates of dissolution. Dissolution will also generally be faster the more finely divided the initial polymer is. The time required for dissolution will vary with the particular polymer and solvent chosen, as well as the other factors discussed above, but generally will be in the range of a few hours to a few weeks. Dissolution can be followed visually (see "General Procedure"). As discussed above, dissolution in the solvents of the instant invention is faster than in some solvents previously known for these polymers (compare the results of the appropriate Examples and Comparative Examples).

It is preferred if the polymer has a concentration of about 1 to 5 percent by weight of the solution, but the higher the molecular weight of the polymer, the more difficult it is to make relatively concentrated solutions. Preferred ingredients for the process are the same as given for the solution composition above.

The above polymer dissolution process may also be used to remove TFE containing polymer from objects that are coated or encapsulated, or otherwise covered with the polymer. Removal of the coating or encapsulant allows for repair of internally damaged parts, or removal (and subsequent replacement) of damaged coatings, allowing reuse of the object, for example electronic parts. This is particularly useful for TFE containing polymers with melting points about 250° C. or more, since the solvents claimed herein can often be used at temperatures at or below their atmospheric boiling points. It is preferred if the removal of the polymer is carried out at atmospheric pressure, since when done with solvents having lower atmospheric boiling points, pressure vessels would be required. An especially preferred solvent is perfluorodimer.

The solutions, claimed, and made in the above process above, may be used to form free standing films of the polymers, or to coat or encapsulate objects with the polymer. Films may be made by processes known in the art for making films from solutions. Generally these processes will include making a thin layer of the solution (the exact thickness determined by the polymer concentration and the thickness of the desired film), and then removal of the solvent by, for example, evaporation of, or extraction of the perfluorinated cycloalkane. Care should De taken to keep the solutions hot enough to avoid premature precipitation of the polymer. Films can be formed for example, by drawing of the solution and evaporation of the solvent (see Example 11). Films can also be formed by extrusion and coextrusion of the solution, followed by removal of the perfluorinated cycloalkane, or by forming a layer of the solution by spraying. In spraying the solvent may start to evaporate before the spray reaches the surface the film will be built up on.

Objects may be coated or encapsulated by contacting, as by dipping, the object into a solution of the polymer, removing the excess solution, if any, by allowing it to flow off, and then removing the solvent, as by heating in a drying oven. The solution may also be painted onto a part's surface. The solutions are especially useful for coating or encapsulating objects with complex shapes which cannot be easily encapsulated (particularly without gas pockets) by other methods. It is preferred that during the coating or encapsulation process that the object being coated or encapsulated is heated to the approximate polymer solution temperature before being contacted with the polymer solution. It is preferred if the solution used to coat or encapsulate has a polymer concentration of about 1 to about 20 percent by weight, more preferably about 2 to about 12 percent by weight. Examples 8–10 and 12 illustrate coating or encapsulation of aluminum bars.

It is preferred if the object to be coated or encapsulated has a complex shape, that is its surfaces are not planer or simple curvilinear, so that coating such a surface would be difficult with a preformed film, for example. It is also preferred if film formation, coating or encapsulation is carried out at atmospheric pressure.

Films made from the polymers used herein are useful in electronic parts (e.g., capacitors) and for use in highly corrosive environments. When used as coatings or encapsulants the polymers protect that part they are coating or encapsulating from environmental contamination or corrosion. Such parts may be wires, electronic boards or other components, or parts for the chemical process industry where corrosive chemicals are used.

The solutions of the instant invention can also be used to spin fibers, as for example by wet spinning. Such spinning methods are know, see for example H. Mark, et al., Ed., Encyclopedia of Polymer Science and Engineering, 2nd Ed., Vol. 6, John Wiley & Sons, Inc., New York, 1986, p.

802–839. A fiber can also be formed by "pulling" on the solution to draw a fiber from it (see Example 16). The solutions disclosed herein can also be used to impregnate porous articles with the dissolved fluoropolymer by absorbing the solution into the porous article and then removing the solvent as by evaporation. Suitable porous articles include fabric (woven and nonwoven), paper, and porous thermoplastic or thermoset resins. The instant solutions can also be used to cast parts with three dimensional shapes. For example the solution can be poured into a mold and the solvent allowed to evaporate. If the mold is not full after solvent evaporation, more solution can be added, and the process repeated, until the mold is full of solid polymer. The part is then removed from the mold.

In the following Examples and Comparative Examples, some of the PTFE polymers used are those described in W. H. Tuminello, et al., Macromol., vol. 21, p. 2606–2610 (1988) (which is hereby included by reference), and the same codes to identify PTFE samples are used herein as are used in the reference (see Table A). The solvents used in the Examples and Comparative Examples are from the following sources (the formulas following the names are used as abbreviations in the Examples):

perfluorobiphenyl ($C_{12}F_{10}$)—PCR, Inc., Gainesville, Fla.

perfluoro(cyclohexylmethyl)decalin ($C_{17}F_{30}$)—Rhone-Poulenc, ISC Division, Avonmouth, Bristol, United Kingdom perfluorodecalin ($C_{10}F_{18}$)—PCR, Inc.

perfluoroeicosane ($C_{20}F_{42}$)—PCR, Inc., purified by either double distillation or sublimation.

perfluoro(1-methyldecalin) ($C_{11}F_{20}$)—PCR, Inc.

perfluoro(dimethyldecalin) ($C_{12}F_{22}$)—PCR, Inc.

perfluorohexadecane ($C_{16}F_{34}$)—PCR, Inc.

perfluoronaphthalene ($C_{10}F_8$)—Aldrich Chemical Co., Milwaukee, Wis.

perfluorotetracosane ($C_{24}F_{50}$)—Aldrich Chemical Co.

perfluorotetradecahydrophenanthrene ($C_{14}F_{24}$)—PCR, Inc.

perfluorodimer—By "perfluorodimer" herein is meant a byproduct from the fluorination of phenanthrene using a combination of $CoF_3$ and fluorine, as described in British Patent 1,281,822.

When phenanthrene is thus fluorinated to perfluorotetradecahydrophenanthrene, a higher boiling fraction is obtained upon fractional distillation of the crude liquid product. This fraction has a boiling range of 280° C. to about 400° C. at atmospheric pressure, typically about 320°–340° C. It has a small amount of olefin and a very small amount of hydrogen in it, both of which can be further reduced by postfluorination. It is believed that most of this mixture consists of the general structure

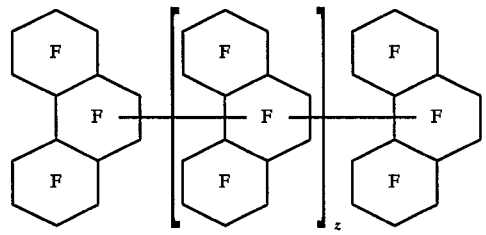

wherein z is 0, 1 or 2. Also believed to be present in smaller quantities are compounds from ring fusion and/or ring opening of the above compounds or their precursors such as

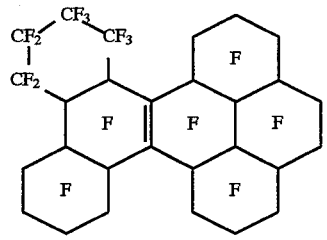

from the compound where z is 0 (it is not possible to say with assurance that this particular isomer is in the mixture—it is merely illustrative of one possible structure consistent with the analytical data and the synthetic method). Similar fused structures from the compounds where z is 1 or 2 are also believed to be present. Although traces of hydrogen are present, the location has not been determined. The term perfluorodimer is used throughout this Application to describe this material.

TABLE A

| Polymer | $M_w{}^a$ | $M_w/M_n{}^b$ | Melting Point, °C. |
|---|---|---|---|
| PTFE-5 | $2.3 \times 10^6$ | 8.2 | 328.4 |
| PTFE-6 | $0.34 \times 10^6$ | 2.8 | 326.5 |

General Procedure

Unless otherwise noted, Examples 1–7 and Comparative Examples 1–10 were carried out in the following way. Borosilicate glass tubes, 8 mm OD with a 1 mm thick wall were sealed at one end and then the solvent and PTFE were added. The PTFE was virgin micron sized beads. The relative amounts of polymer and solvent were such so as to provide a 1 to 5% solution by weight of the polymer (see individual Examples). Enough solvent and polymer were added so that when the tubes were sealed with final lengths of 7.5–10 cm, about one-half of the tube contained liquid. The tubes were then placed in holes in an aluminum block that was suitably heated and insulated. Other holes in the block allowed observation of the tube. The temperature of the block could be controlled to ±0.5° C.

If the polymer eventually dissolved, the following was observed. Initially the free flowing, solid, opaque PTFE particles in the liquid solvent were observed. The temperature of the tube was increased about 1° C./min. At the temperature at which the crystallites in contact with the solvent initially melt (Tm), the opacity disappeared, and particle swelling and coalescence was observed. At this initially observed melting point, the mixture became clear, and the particles had coalesced, so that a uniform non-flowing mass was at the bottom of the tube. The temperature was then held at or just above this temperature. At this point the refractive indices of the solvent and mass were so similar that the interface could not be detected visually. The presence of the mass was confirmed by turning the heating block on its side so the mobile solvent flowed away from the viscous mass. The volume of the polymer rich mass increased to a limiting value in a fairly short time, and then nothing appeared to happen for a longer time until the polymer rich mass started to flow. Shortly after that, the mixture became homogeneous. Dissolution time was taken as the time to form the final homogeneous mass.

Once dissolution occurred, cooling was undertaken in 5° C. increments. By observing when crystallites formed (precipitated from solution) the crystallization temperature (Tc) of the polymer from solution was determined. The true melting point of the mixture was determined by reheating in 5° C. increments and observing the temperature at which the mixture became transparent. Tm was usually about 5 to 10° C. below the initially observed melting point. Upon repeated reheating and cooling Tm and Tc were reproducible.

EXAMPLE 1 AND COMPARATIVE EXAMPLES 1-8

These Examples and Comparative Examples were carried out using the General Procedure. The PTFE used was PTFE-5 (Table A) and the ingredient amounts were chosen so that a one weight percent solution of polymer in solvent would be attained. The results are shown in Table 1.

TABLE 1

| Example | Comp. Example | Solvent | Tm (°C.) | $T_{Boil}$ (°C.)[a] | $T_{Crit}$ (°C.)[b] |
|---|---|---|---|---|---|
| — | 1 | $C_{16}F_{34}$ | ins[c] | 235 | 325 |
| — | 2 | $C_{20}F_{42}$ | 310 | 300 | 380 |
| — | 3 | $C_{24}F_{50}$ | 315 | 340 | 425 |
| — | 4 | $C_{10}F_{18}$ | ins[c] | 141 | 293 |
| — | 5 | $C_{11}F_{20}$ | ins[c] | 159 | 313 |
| — | 6 | $C_{12}F_{22}$ | ins[c] | 180 | — |
| 1 | — | $C_{14}F_{24}$ | 278 | 215 | 377 |
| — | 7 | $C_{10}F_{8}$ | 280[d] | 218 | 400 |
| — | 8 | $C_{12}F_{10}$ | 280[d] | 216 | 400 |

[a]Atmospheric boiling point from literature sources
[b]Critical temperature from literature sources or estimated
[c]Insoluble or partially insoluble under autogenous pressure
[d]Discolored

EXAMPLE 2 AND COMPARATIVE EXAMPLES 9-10

The same procedure and materials were used as in Examples 1 and Comparative Examples 1-8, except that the tubes were heated to a constant temperature, and held at that temperature while the polymer dissolved, so as to measure relative rates of dissolution. Times and temperatures are given in Table 2.

TABLE 2

| Example | Comp. Example | Solvent | Hrs. to Dissolve | Temp (°C.) |
|---|---|---|---|---|
| — | 9 | $C_{20}F_{42}$ | 198–214 | 300 |
| — | 10 | $C_{24}F_{50}$ | 92 | 330 |
| 2 | — | $C_{14}F_{24}$ | 54 | 300 |

EXAMPLES 3-5

The same procedure as in Example 2 was used, except the polymer was PTFE-6, and the polymer concentration was 5 weight percent. The results are given in Table 3.

TABLE 3

| Example | Solvent | Hrs. to Dissolve | Temp (°C.) | $T_{Boil}$ (°C.) |
|---|---|---|---|---|
| 3 | $C_{14}F_{24}$ | 54 | 300 | 215 |
| 4 | $C_{17}F_{30}$ | <16 | 300 | 260 |
| 5 | perfluorodimer | 15–20 | 300 | 320–340 |

EXAMPLES 6 AND 7

The general procedure was followed in both cases to make 1 weight percent solutions in $C_{14}F_{24}$. In Example 6 a copolymer of 1 mole percent perfluoro(propyl vinyl ether) and 99 mole percent TFE, which has a reported melting point (in the absence of solvent) of 305° C., was used. In Example 7, a copolymer of 10 mole percent hexafluoropropylene and 90 mole percent TFE, which has a reported melting point (in the absence of solvent) of 265° C., was used. The results are shown in Table 4.

TABLE 4

| Example | $T_m$ (°C.) | $T_c$ (°C.) |
|---|---|---|
| 6 | 260 | 233 |
| 7 | 200 | 180 |

EXAMPLE 8

Three g of PTFE (M.P. 331° C., $M_w$ 1,710,000, $M_w/M_n$ = 3.61) was dissolved in 100 g of perfluorodimer by stirring at about 320° C. Aluminum bars 3.2 mm thick by 12.7 mm wide were prepared by washing with 1,1,2-trichloro-1,2,2-trifluoroethane and air drying. The aluminum bars were heated to about 300° C. and coated with the PTFE solution by dipping the hot bars into the hot solution. Approximately 0.9 g solution was deposited on a 2.9 cm length of the bar. The bars were dried in an air circulating oven overnight at 150° C. followed by 2 hrs. at about 330° C. This resulted in a polymer coating about 0.038 mm thick on the dipped portion of the bar.

EXAMPLE 9

The polymer used is composed of about 3 weight percent perfluoro(propyl vinyl ether) and about 97 weight percent tetrafluoroethylene and has a melting point of 305° C.

Three g of polymer were dissolved in 97 g of perfluorodimer by stirring at a temperature of about 310° C. Aluminum bars 3.2 mm thick by 12.7 mm wide and aluminum sheet stock were prepared by washing with 1,1,2-trichloro-1,2,2-trifluoroethane and air drying. Bars were coated with solution by dip coating with the solution maintained at about 260° C. Films were prepared by pouring 260° C. solution on the aluminum sheet stock and drawing with a draw bar. Both bars and films were dried overnight in an air circulating oven maintained at a temperature of 150° C. followed by two hours at 306° C.

This experiment produced bars coated with about 0.05 mm of polymer and film of about 0.005 mm thickness.

EXAMPLE 10

The polymer used in Examples 10 and 11 is composed of about 11 weight percent hexafluoropropylene and about 89 weight percent tetrafluoroethylene, and melts at about 257° C.

Three g of fluoropolymer was dissolved in 97 g of perfluorodimer by stirring for about 2 hrs. at a temperature of about 300° C. The solution was cooled to about 215° C. An aluminum bar 3.2 mm thick by 12.7 mm wide was washed with 1,1,2-trichloro-1,2,2-trifluoroethane and dried. Part of the bar was coated with the fluoropolymer solution by dipping into the hot solution. The bar was dried by heating in an air circulating oven overnight at a temperature of 150° C. followed by 2 hrs. at 300° C. This resulted in a uniform appearing coating approximately 0.0064 mm thick.

The coated bar was placed in a 6N HCl solution and kept there for 15 mins. The bar was protected from attack by the acid solution. By comparison, an uncoated bar was placed in the same solution. Vigorous reaction ensued. The bar was removed after 8 mins. Approximately two thirds of the original weight of the bar was lost.

EXAMPLE 11

Thirty g of polymer was dissolved in 300 g of perfluorodimer by adding the polymer slowly with stirring over a 2 hr period with the solution maintained at a temperature of about 305° C.

A 15.2 cm square piece of aluminum 0.13 mm thick was washed with 1,1,2-trichloro-1,2,2-trifluoroethane, dried, and placed on a hot plate. The aluminum was heated to a temperature of 220° C. The solution was cooled to a temperature of 280° C. and a sample of the solution was then poured on the aluminum. This sample was then drawn with a draw bar with a 0.13 mm gap. The aluminum plate was then removed from the hot plate and cooled to ambient temperature. The sample was then placed in an air circulating oven and maintained at a temperature of 150° C. overnight. The sample was then heated to about 300° C. and held there for 2 hrs. before being then allowed to cool down to ambient temperature.

This resulted in a uniform appearing film of polymer 0.0025 to 0.0050 mm thick.

EXAMPLE 12

PTFE-6 (0.0040 g) was weighed into an aluminum weighing pan (50 mm diameter, 15 mm high). This amount was calculated to give a 1 µm coating. Forty g of $C_{14}F_{24}$ was then added and a sufficient amount of solvent was placed in the pressure chamber enclosing the sample to keep the atmosphere saturated with solvent. The pressure vessel was made of stainless steel. The container was a so-called shaker tube. It was made of stainless steel with a 5.1 cm diameter and 400 mL capacity.

The sample was held in the shaker tube at 300° C. for 3 days. The pressure was monitored to be about 600 kPa. Complete dissolution was assumed under these conditions based on previous experience with these materials.

The solvent was evaporated under pressure at 300° C. to keep bubbles from forming. About ¾ of the solvent was removed in the first 15 minutes by passing air through the shaker tube at 10 mL/min., 552 kPa. The pressure was kept at 552 kPa for 4 hrs. then dropped to 303 kPa and held there for about 12 more hrs.

The tube was cooled and the coated aluminum pan removed. The pan had deformed during the process so only a thick band of the pan bottom appeared coated. The coated area made acetone form a bead while diethyl ether wet the surface. The surface tensions for acetone and diethyl ether are 2.4 and 1.7 µN·m, respectively. This behavior is consistent with a PTFE surface (surface tension=1.8 µN·m). A piece of PTFE showed the identical behavior, while water (surface tension=7.2 µN·m) would not bead on an uncoated aluminum pan.

Scanning electron microscopy revealed a µm thick layer on the surface appearing to be PTFE by the abovementioned wetting experiments. The surface appeared smooth and pinhole-free. X-ray fluorescence showed fluorine was only present on the micron thick layer and aluminum only was present in what appeared to be the substrate. Higher magnification revealed strong evidence for excellent adhesion by showing the presence of many strands holding the fluoropolymer surface to the substrate.

EXAMPLE 13

Three grams of the polymer used in Example 9 were dissolved in 100 grams of perfluorodimer by stirring at a temperature of about 310° C. An aluminum bar 3.2 mm thick by 1.3 cm wide was prepared by washing with 1,1,2-trichloro-1,2,2-trifluoroethane and drying. The bar was heated to about 290° C. and dipped into the solution maintained at about 300° C. The coated bar was dried overnight in an air circulating oven at about 120° C. followed by two hours at about 220° C. and an additional 2 hours at about 320° C. This resulted in about 0.01 gram of polymer film coated on about 2.2 cm of the bar thus giving a film of approximately 0.005 to 0.008 mm thickness. The coated section of the bar was placed into a 6N HCl solution at ambient temperature and kept there for 15 minutes. The bar was unaffected by this treatment.

EXAMPLE 14

Three grams of powdered PTFE was dissolved in 97 grams perfluorodimer oligomer by stirring at a temperature of about 300° C. An aluminum bar 3.2 mm thick by 1.3 cm wide was prepared by lightly sanding, washing with 1,1,2-trichloro-1,2,2-trifluoroethane and drying. The bar was heated to about 270° C. and dipped into the solution maintained at about 310° C. The coated bar was dried overnight at about 120° C. in an air circulating oven then for 2 hours at 220° C. followed by 2 hours at 320° C. This resulted in a uniform appearing coating about 0.005 to 0.008 mm thick on the coated portion of the bar. This portion of the bar was then placed into an ambient temperature 6N HCl solution and kept there for 15 minutes. The sample was unaffected by this treatment.

A glass microscope slide was washed with 1,1,2-trichloro-1,2,2-trifluoroethane and dried. This slide was dipped into the hot (about 310° C.) solution. The slide was given the same drying treatment—overnight at 120° C.—2 hours at 220° C.—2 hours at 320° C. A polymer coating of approximately 0.013 mm was deposited on the glass slide.

EXAMPLE 15

Perfluorodimer (150 g) was placed in an insulated 100 ml beaker and heated to 302° C. A 2.5×10.2 cm piece of 0.13 mm thick aluminum foil coated with 0.05 mm of the polymer of Example 10 was immersed in the beaker for 20 minutes. During this time, the temperature of the perfluorodimer rose to 312° C. The foil was removed from the bath and cooled to room temperature. Residue was removed by washing with 1,1,2-trichloro-1,2,2-trifluoroethane. The aluminum foil was then dissolved in a solution of sodium hydroxide. The top 2.5 cm of the polymer was intact. The next 2.5 cm appeared thinner. The bottom 5 cm which had been immersed in the solvent had dissolved.

EXAMPLE 16

Eight grams of the polymer of Example 9 was added to 45 g of perfluorodimer in a round bottomed flask. The polymer was slowly added while stirring, the whole apparatus heated in a molten salt bath at 300° C. A homogeneous solution was obtained in a few hours. A fiber was formed upon dipping the end of a metal rod in the hot solution and withdrawing it.

What is claimed is:

1. In a process for coating or encapsulating an article using a solution of a polymer containing tetrafluoroethylene units dissolved in a perfluorinated cycloalkane, said process being selected from the group of processes consisting of:

(1) painting the solution on the article to be coated or encapsulated and removing the solvent by evaporation, and (2) dipping the article to be coated or encapsulated in the solution, removing the excess solution, if any, by allowing it to flow off, and then removing the solvent by evaporation, the improvement of using as the solvent a perfluorinated cycloalkane or a perfluorinated cycloalkane containing one or more perfluoroalkyl and perfluoroalkylene groups; wherein the total number of carbon atoms in said perfluoroalkyl and perfluoroalkylene groups, when present, is less than the total number of ring carbon atoms in said perfluorocycloalkane;

with the provisos that:

(a) the critical temperature of said solvent is 340° C. or more; and (b) the melting point of said polymer is about 250° C. or more.

2. In a process for impregnating a porous article using a solution of a polymer containing tetrafluoroethylene units dissolved in a perfluorinated cycloalkane by absorbing the solution into the porous article and then removing the solvent by evaporation, the improvement of using as the solvent a perfluorinated cycloalkane or a perfluorinated cycloalkane containing one or more perfluoroalkyl and perfluoroalkylene groups; wherein the total number of carbon atoms in said perfluoroalkyl and perfluoroalkylene groups, when present, is less than the total number of ring carbon atoms in said perfluorocycloalkane;

with the provisos that:

(a) the critical temperature of said solvent is 340° C. or more; and (b) the melting point of said polymer is about 250° C. or more.

3. The improvement as recited in claim 1 wherein the article is of complex shape.

4. The improvement as recited in claim 1 wherein said coated or encapsulated article is obtained by removing the solvent from a layer of the solution on the surface of the article at atmospheric pressure.

* * * * *